(12) United States Patent
Lim et al.

(10) Patent No.: US 9,667,760 B2
(45) Date of Patent: May 30, 2017

(54) MODULE SLICES IN MODULAR PORTABLE ELECTRONIC DEVICE

(71) Applicant: Motorola Mobility LLC, Chicago, IL (US)

(72) Inventors: David K Lim, Glenview, IL (US); Joseph Allore, Mundelein, IL (US); Paul Fordham, Wauconda, IL (US); Michael J Lombardi, Lake Zurich, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 14/931,980

(22) Filed: Nov. 4, 2015

(65) Prior Publication Data

US 2017/0126864 A1    May 4, 2017

(51) Int. Cl.
*H04M 1/02*   (2006.01)
*H04M 1/725*  (2006.01)

(52) U.S. Cl.
CPC ......... *H04M 1/0254* (2013.01); *H04M 1/026* (2013.01); *H04M 1/72575* (2013.01)

(58) Field of Classification Search
CPC .................. H04M 1/0249; H04M 1/72575
USPC ............... 455/550.1, 551, 556.1, 575.6, 90.3
See application file for complete search history.

(56) References Cited

U.S. PATENT DOCUMENTS

| | | | | |
|---|---|---|---|---|
| 6,027,828 A | * | 2/2000 | Hahn | H01M 2/1022 429/100 |
| 7,499,282 B1 | * | 3/2009 | Loucks | G06F 1/1626 361/730 |
| 9,467,548 B1 | * | 10/2016 | Allore | H04M 1/72527 |
| 2016/0316050 A1 | * | 10/2016 | Lombardi | H04M 1/7253 |

* cited by examiner

*Primary Examiner* — John J Lee
(74) *Attorney, Agent, or Firm* — Miller, Matthias & Hull LLP

(57) ABSTRACT

In an embodiment of the disclosed principles, a modular device system includes a base device configured to accept multiple modules at once. The system further includes thin modules designed to stack upon one another on the base device to provide extended functionality. In an embodiment, an alignment mechanism is provided to allow multiple modules to be easily stacked such that their stacking also provides convenient electrical interconnection between the modules and the base device.

18 Claims, 10 Drawing Sheets

MODULE SLICES IN MODULAR PORTABLE ELECTRONIC DEVICE

TECHNICAL FIELD

The present disclosure is related generally to modular mobile communication devices, and, more particularly, to a system and method for adding functionality to a base device by adding multiple modules.

BACKGROUND

As small and light as the average cell phone has become, the dimension of thickness has become an important characteristic for consumers. Thinner devices can be more conveniently pocketed, and can be slid into purses and backpacks with no difficulty. The average phone thickness has dropped by 50% in the last decade alone, and considerations such as durability and hand feel would indicate that the industry has arrived at about the ideal thickness just within the past few years.

Nonetheless, as cellular phones continue to displace more traditional devices for productivity and entertainment, the number of features and functions demanded by users has grown enormously. As an example, even the television has been somewhat displaced by the cellular phone. Fully 75% of juveniles watch short content on a portable device, and 50% of them even watch full-length programming on their devices. The latter figure represents an increase of almost 25% in just one year.

With functions like video entertainment, audio entertainment, photography, scheduling and gaming migrating to the mobile platform, it has become increasingly difficult for manufacturers to keep the weight, size and thickness of cellular devices within the ideal limits arrived at in the last decade.

While the present disclosure is directed to a system that can eliminate certain shortcomings noted above, it should be appreciated that such a benefit is neither a limitation on the scope of the disclosed principles nor of the attached claims, except to the extent expressly noted in the claims. Additionally, the discussion of technology in this Background section is reflective of the inventors' own observations, considerations, and thoughts, and is in no way intended to accurately catalog or comprehensively summarize the art in the public domain. As such, the inventors expressly disclaim this section as admitted or assumed prior art with respect to the discussed details. Moreover, the identification herein of a desirable course of action reflects the inventors' own observations and ideas, and should not be assumed to indicate an art-recognized desirability.

BRIEF DESCRIPTION OF THE SEVERAL VIEWS OF THE DRAWINGS

While the appended claims set forth the features of the present techniques with particularity, these techniques, together with their objects and advantages, may be best understood from the following detailed description taken in conjunction with the accompanying drawings of which:

DETAILED DESCRIPTION

Before presenting a fuller discussion of the disclosed principles, an overview is given to aid the reader in understanding the later discussion. As noted, while a modular device architecture provides many benefits observed by the inventors, such a design also needs to operate without excessively increasing the thickness of the base device. Moreover, in a modular system wherein additional modules are configured to each provide an additional function to a base device, a user may wish to add multiple additional functions without trading out modules.

In an embodiment of the disclosed principles, the modular device system includes a base device configured to accept multiple modules at once. Moreover, the system includes thin modules designed to stack upon one another without losing functionality. This feature allows flexibility to the end user and also provides more flexibility for developers in the development of compatible modules. In an embodiment, an alignment mechanism is provided to allow multiple modules to be easily stacked such that their stacking also provides convenient electrical interconnection between the modules and the base device.

With this overview in mind, and turning now to a more detailed discussion in conjunction with the attached figures, the techniques and structures of the present disclosure are illustrated as being implemented in a suitable computing environment. The following device description is based on embodiments and examples of the disclosed principles and should not be taken as limiting the claims with regard to alternative embodiments that are not explicitly described herein. Thus, for example, while FIG. 1 illustrates an example mobile device with respect to which embodiments of the disclosed principles may be implemented, it will be appreciated that other device types may be used.

Figure 1:
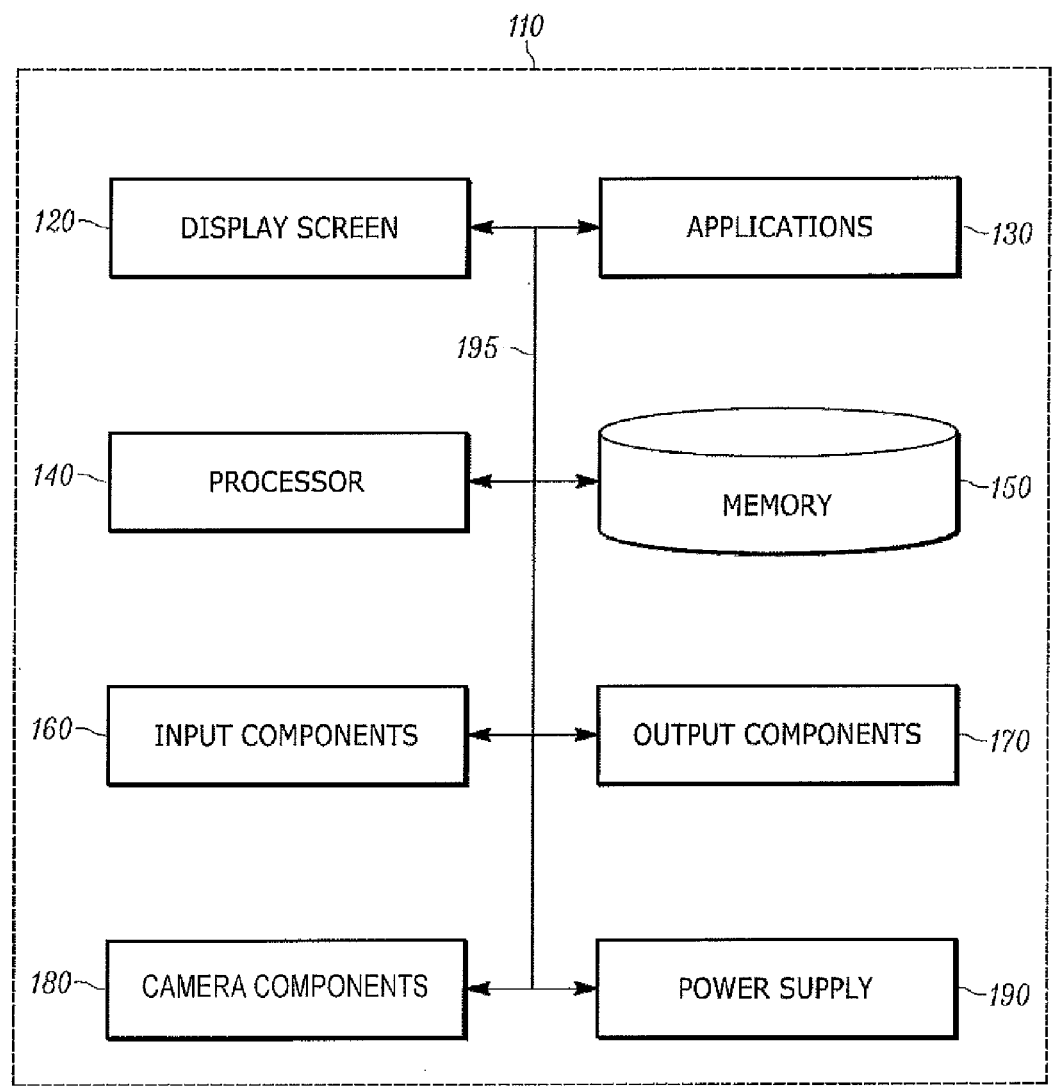
FIG. 1 is a simplified schematic of an example device with respect to which embodiments of the presently disclosed principles may be implemented.

The schematic diagram of FIG. 1 shows an exemplary component group 110 forming part of an environment within which aspects of the present disclosure may be implemented. In particular, the component group 110 includes exemplary components that may be employed in a device corresponding to the first device and/or the second device. It will be appreciated that additional or alternative components may be used in a given implementation depending upon user preference, component availability, price point, and other considerations.

In the illustrated embodiment, the components 110 include a display screen 120, applications (e.g., programs) 130, a processor 140, a memory 150, one or more input components 160 such as speech and text input facilities, and one or more output components 170 such as text and audible output facilities, e.g., one or more speakers.

The processor 140 may be any of a microprocessor, microcomputer, application-specific integrated circuit, or the like. For example, the processor 140 can be implemented by one or more microprocessors or controllers from any desired family or manufacturer. Similarly, the memory 150 may reside on the same integrated circuit as the processor 140. Additionally or alternatively, the memory 150 may be accessed via a network, e.g., via cloud-based storage. The memory 150 may include a random access memory (i.e., Synchronous Dynamic Random Access Memory (SDRAM), Dynamic Random Access Memory (DRAM), RAMBUS Dynamic Random Access Memory (RDRM) or any other type of random access memory device). Additionally or alternatively, the memory 150 may include a read only memory (i.e., a hard drive, flash memory or any other desired type of memory device).

The information that is stored by the memory 150 can include program code associated with one or more operating systems or applications as well as informational data, e.g., program parameters, process data, etc. The operating system and applications are typically implemented via executable instructions stored in a non-transitory computer readable medium (e.g., memory 150) to control basic functions of the electronic device. Such functions may include, for example, interaction among various internal components and storage and retrieval of applications and data to and from the memory 150.

Further with respect to the applications 130, these typically utilize the operating system to provide more specific functionality, such as file system service and handling of protected and unprotected data stored in the memory 150. Although many applications may provide standard or required functionality of the user device 110, in other cases applications provide optional or specialized functionality, and may be supplied by third party vendors or the device manufacturer.

Finally, with respect to informational data, e.g., program parameters and process data, this non-executable information can be referenced, manipulated, or written by the operating system or an application. Such informational data can include, for example, data that are preprogrammed into the device during manufacture, data that are created by the device or added by the user, or any of a variety of types of information that are uploaded to, downloaded from, or otherwise accessed at servers or other devices with which the device is in communication during its ongoing operation.

The device having component group 110 may include software and hardware camera components 180 to allow photography. Such camera components 180 will typically provide at least the ability to acquire an image with fixed focus, and in an embodiment also provide long-range and variable focusing capabilities.

In an embodiment, a power supply 190, such as a battery or fuel cell, may be included for providing power to the device and its components 110. All or some of the internal components 110 communicate with one another by way of one or more shared or dedicated internal communication links 195, such as an internal bus.

In an embodiment, the device 110 is programmed such that the processor 140 and memory 150 interact with the other components of the device 110 to perform certain functions. The processor 140 may include or implement various modules and execute programs for initiating different activities such as launching an application, transferring data, and toggling through various graphical user interface objects (e.g., toggling through various display icons that are linked to executable applications).

In the context of the modular device system, each of the base device and the add-on modules may have some or all of the components shown and discussed with respect to FIG. 1. For example, the base device may include all of the illustrated components and an add-on module may omit the display screen 120 and the camera components 180. Similarly, the base device may include networking functionality while another add-on module may lack such capabilities. In this description, the base device and add-on modules may both be referred to as mobile electronic devices, whether stand-alone capable or not. An example of this usage is that a second device (a module) docks to the first device (the base device).

Figure 2:
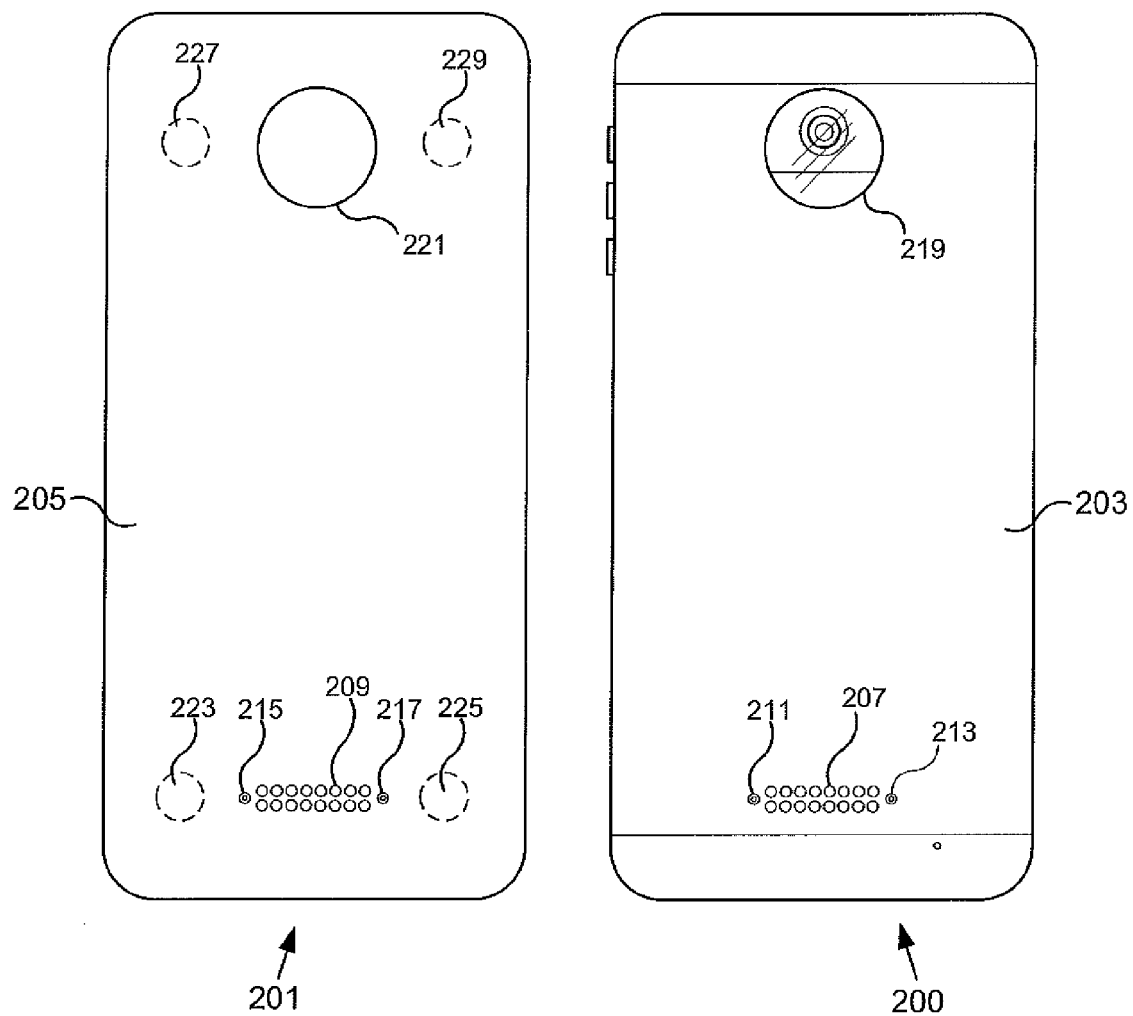
FIG. 2 is view of a first device and a second device, showing the back of the first device and the back of the second device in accordance with an embodiment of the disclosed principles.

Turning to FIG. 2, this figure illustrates a simplified view of the first device 200 and a second device 201, showing the back 203 of the first device 200 and the mating front 205 of the second device 201 in accordance with an embodiment of the disclosed principles. In the illustrated example, each device 200, 201 includes a connector array 207, 209. Although each connector array 207, 209 is shown as a 16-pin connector array, it will be appreciated that other numbers of pins may be used. Although not detailed in the figure, one of the connector arrays 207, 209 will typically include male pins while the other 207, 209 will typically include corresponding female sockets. These contacts will be more fully described later by reference to FIG. 8.

A set of alignment sockets 211, 213 is included adjacent the connector array 207 on the first device 200 in the illustrated embodiment, for mating with matching alignment pins 215, 217 on the second device 201. A third alignment point is provided by a camera protrusion 219 on the first device 200, which is configured and located to fit with a mating circular opening 221 in the second device 201. In an embodiment, the camera protrusion 219 contains the main camera of the device 200 as well as one or more flash LEDs. In an embodiment, the camera protrusion 219 also includes a laser range-finder for faster focus of the main camera.

As noted above, although other camera protrusion shapes are usable and are contemplated herein, a circular shape will be used for the sake of example. Depending upon tolerances in a given implementation, a non-circular camera protrusion may provide a degree of rotational alignment as well and may limit or eliminate the need for other alignment features.

In an embodiment, a set of magnets 223, 225, 227, 229 is embedded in the front of the second device 201. These magnets 223, 225, 227, 229 may be retained on an inner surface of this cosmetic sheet. These magnets may be encased in a steel shroud such that the magnetic field is focused to one side of the magnet assembly rather than extending to both sides. In an embodiment, these magnets 223, 225, 227, 229 attract the steel surface of the back 203 of the first device 200 so as to hold the devices 200, 201 together once the devices 200, 201 are in close proximity. The magnets 223, 225, 227, 229 may be of ceramic, neodymium or other type. Alternatively, the magnets may mate to corresponding ferrous features on the base device 200. The mating magnetic retention features will be described in greater detail later by reference to FIG. 9.

Figure 3:
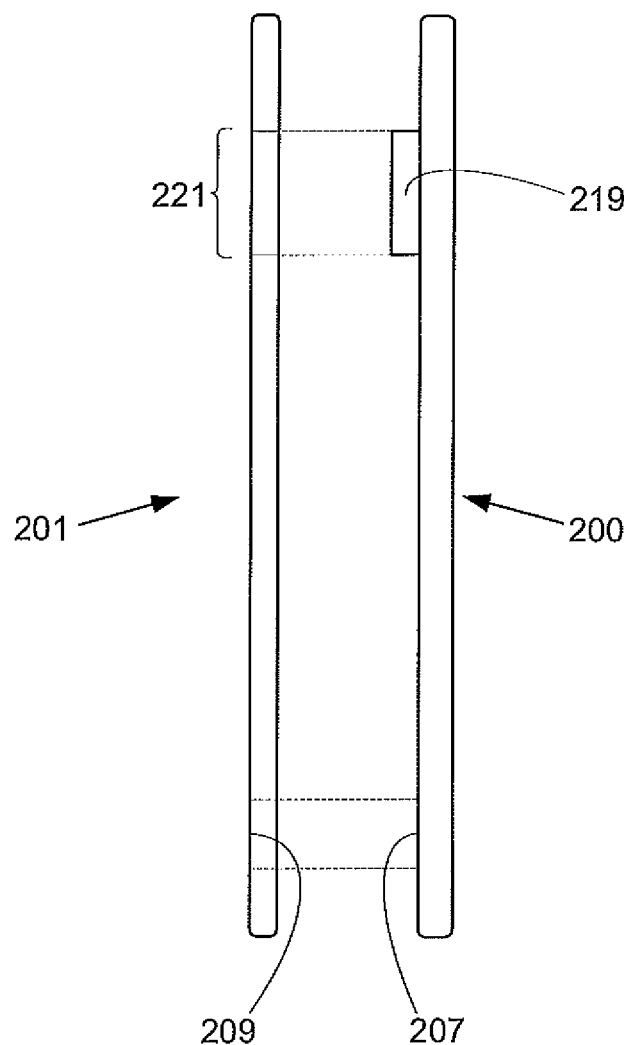
FIG. 3 is a side view of the first device and the second device in accordance with an embodiment of the disclosed principles.

FIG. 3 is a side view of the first device 200 and the second device 201 in accordance with an embodiment of the disclosed principles. As briefly shown in the side view of FIG. 3, when the first device 200 and the second device 201 are docked together, the camera protrusion 219 fits into the mating opening 221 in the second device 201. In addition, the contact array 207 of the first device 200 mates with the contact array 209 of the second device 201 in this configuration.

Ideally the combined device acts as one, using the connections provided by the mating contact arrays 207, 209. In particular, the contact arrays 207, 209 are used in an embodiment to exchange data, commands, power, control signals and so on.

Figure 4:
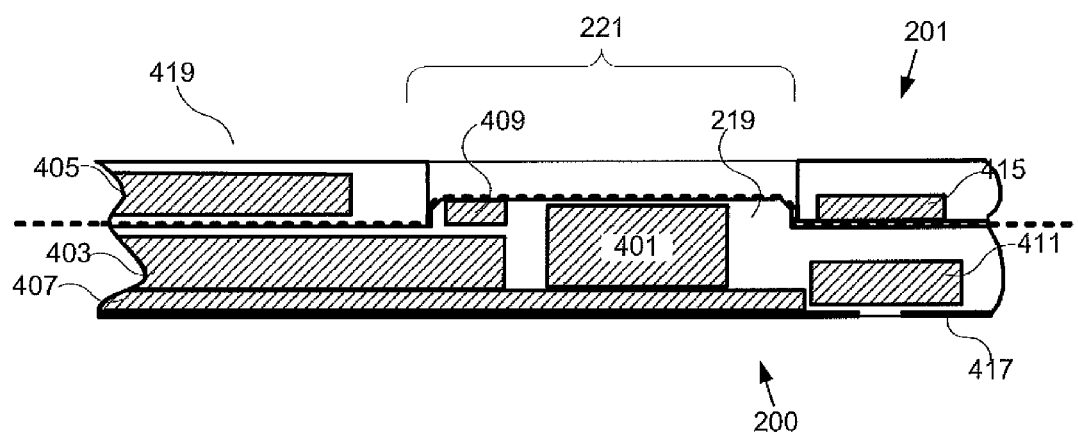
FIG. 4 is a partial cross-sectional side view taken along the vertical centerline of the mated devices showing the camera protrusion of the first device passing through the camera hole of the second device in accordance with an embodiment of the disclosed principles.

Referring to FIG. 4, this figure shows a cross sectional view taken through a vertical centerline of the mated devices 200, 201, illustrating the camera protrusion 219 of the first device 200 keying into the camera hole 221 of the second device 201. The interface between the first device 200 and second device 201 is shown by way of a dashed line. As can be seen, the first device 200 includes, within its housing 417, a camera 401, camera flash 409, battery 403, display screen 407, and earpiece speaker 411. It will be appreciated that other components such as stand-offs, circuit boards and other features not essential to understanding the disclosure have been omitted for the sake of clarity.

The second device 201 similarly includes within its housing 419 a battery 405, camera opening 221 and magnet 415 (one of the four magnets 223, 225, 227, 229 discussed with reference to FIG. 3). Again, components such as stand-offs, circuit boards and other features not essential to understanding the disclosure have been omitted for the sake of clarity.

Figure 5:
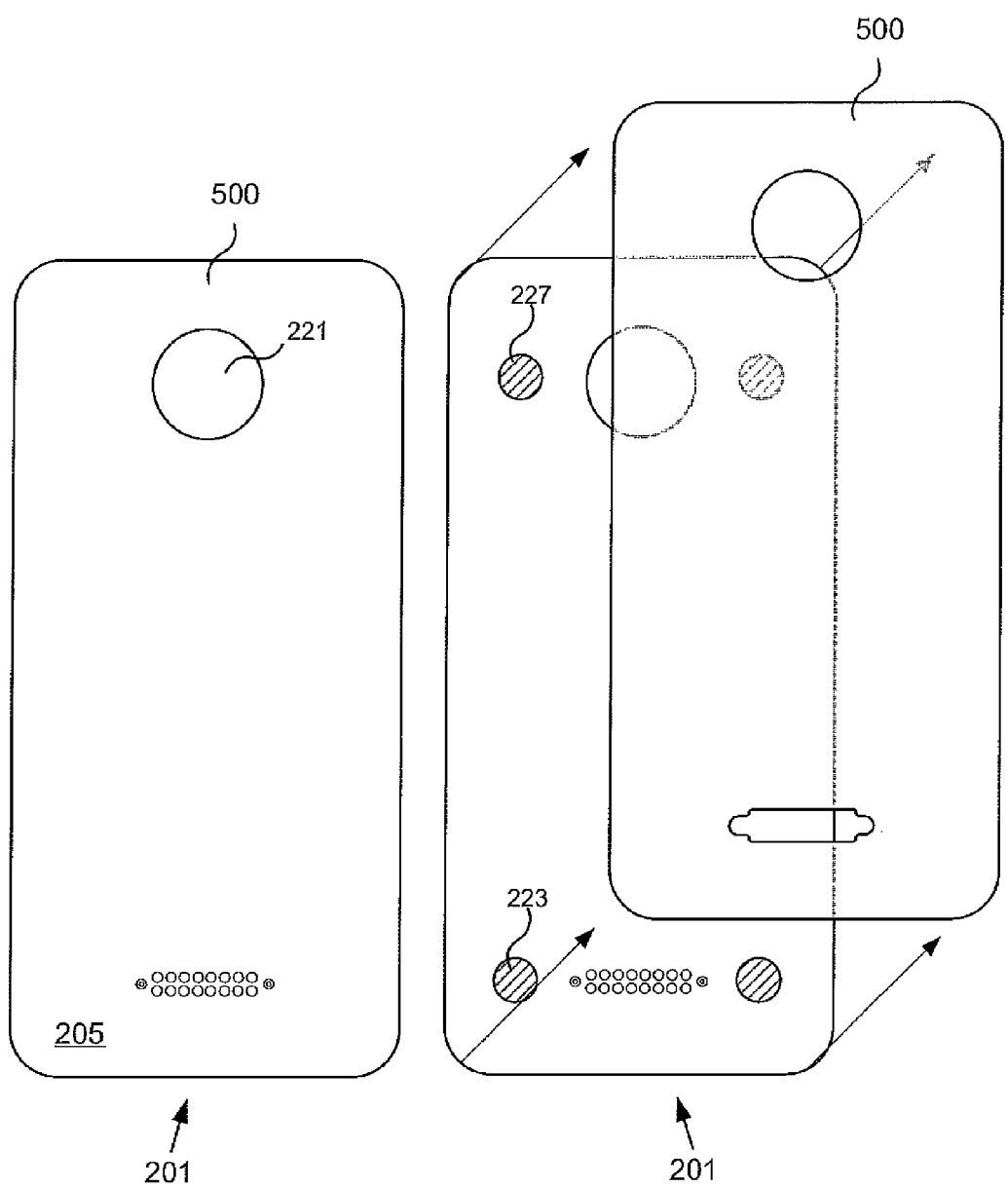
FIG. 5 is a set of front views of the second device, showing the device both with and without a cosmetic sheet in accordance with an embodiment of the disclosed principles.

FIG. 5 illustrates a simplified set of front views of the second device 201, showing the device both with and without a cosmetic sheet 500 covering the magnets. In particular, the left-most view shows the front 205 of the second device 201 as it appears with the cosmetic sheet 500 applied, hiding the magnets, and the right-most view shows the front 205 of the second device 201 exposed with the cosmetic sheet 500 lifted. With the cosmetic sheet 500 lifted, the magnets 223, 225, 227, 229 can be easily seen. Although the cosmetic sheet 500 is shown as semitransparent for ease of understanding, it will be appreciated that the cosmetic sheet 500 need not be semitransparent but may instead be, in whole or in part, transparent, translucent or opaque.

Figure 6:
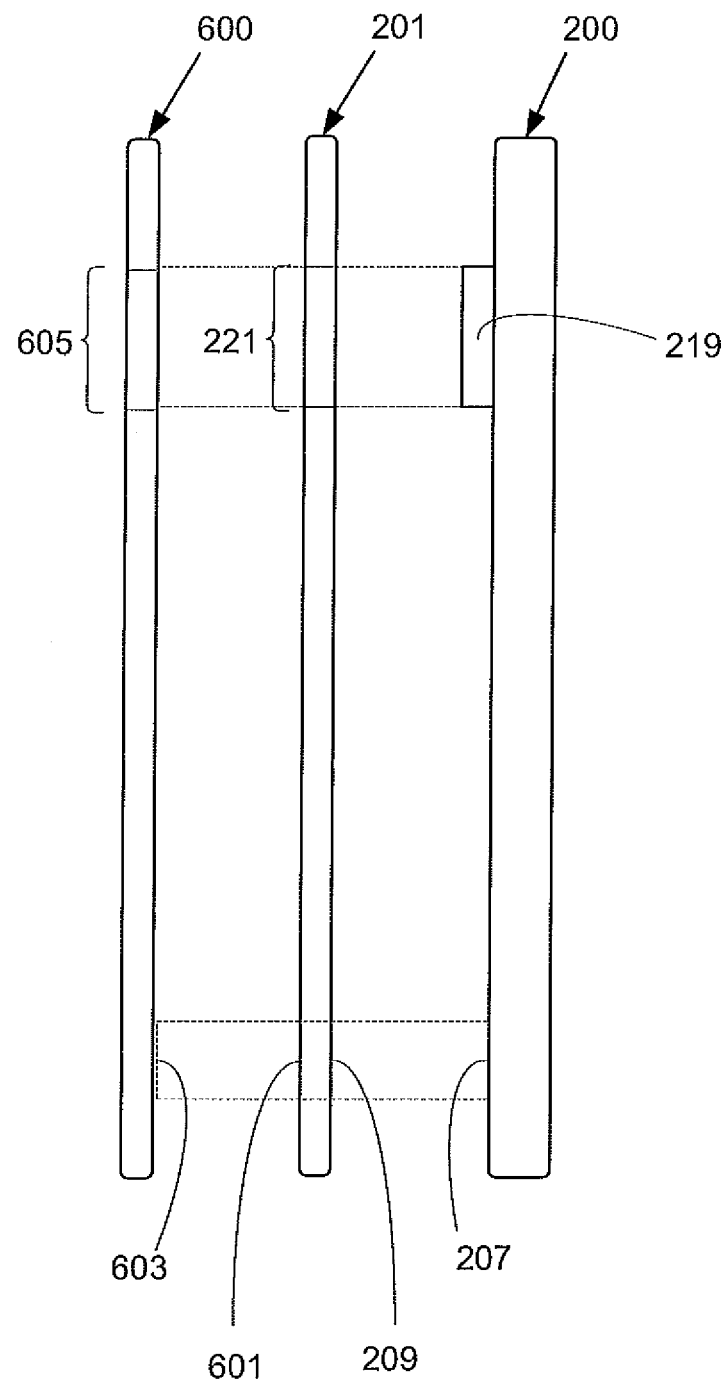
FIG. 6 is a side view of the first device, the second device and a third device in accordance with an embodiment of the disclosed principles.

As noted above, the described configuration allows for multiple modules to be stacked serially on the base device 200 in an embodiment. FIG. 6 is a schematic side view of a base device 200 as well as a first device (module) 201 and a second device (module) 600 in a stacking configuration similar to that shown in FIG. 3. It will be appreciated that although only two additional modules are shown, there is no limit in principle on the number of modules that may be added to the base device. As can be seen, when the first device 200, second device 201 and third device 600 are docked together, the camera protrusion 219 of the first device fits into the mating opening 221 in the second device 201 and a mating opening 605 in the third device 600.

As with the embodiment shown in FIG. 3, the contact array 207 of the first device 200 mates with the contact array 209 of the second device 201 in this configuration. Additionally, a mating contact array 601 on the rear of the second device 201 mates with a contact array 603 on the third device 600. It will be appreciated that the contact array 603 is similar to the contact array 209, so that the third device 600 may be stacked directly onto the first device 200 in an alternative configuration.

In an embodiment, the combined device acts as one, using the connections provided by the mating contact arrays 207, 209. In particular, the contact arrays 207, 209 are used in an embodiment to exchange data, commands, power, control signals and so on. Moreover, in an embodiment of the disclosed principles, one or both modules 201, 600 interface with the device user wholly or partially through the user interface facilities of the base device 200.

Figure 7:
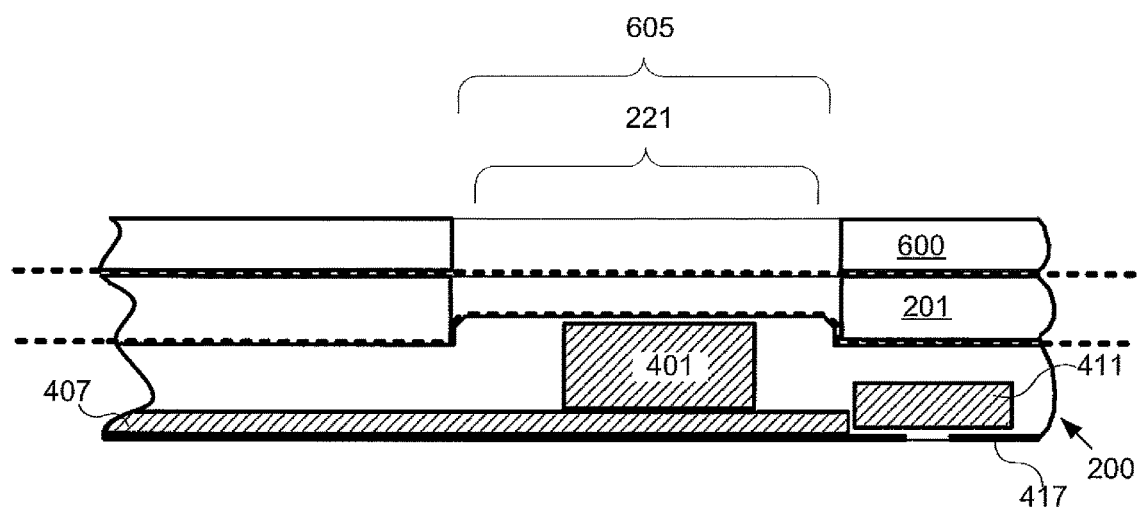
FIG. 7 is a partial cross-sectional side view taken along a perpendicular plane through the mated devices showing the camera protrusion of the first device passing through the camera hole of the second device and the camera hole of a third device in accordance with an embodiment of the disclosed principles.

Turning to FIG. 7, this figure shows a cross sectional view taken through a perpendicular center plane of the mated devices 200, 201, 600, illustrating the camera protrusion 219 of the first device 200 keying into the camera hole 221 of the second device 201 and the coincident camera hole 605 of the third device 600. The interfaces between the devices 200, 201, 600 are shown by way of dashed lines. As can be seen, the first device 200 includes, within its housing 417, a camera 401, a display screen 407, and an earpiece speaker 411. In all devices 200, 201, 600, numerous standard components are omitted in the drawing for the sake of clarity.

Figure 8:
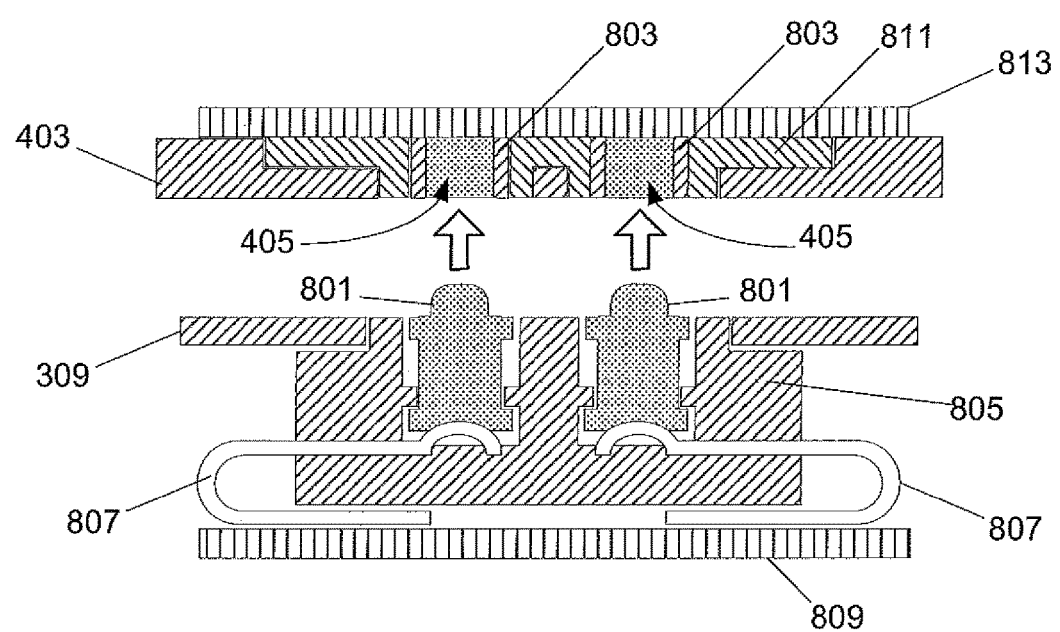
FIG. 8 is a cross-sectional side view showing components of a spring-loaded contact system in accordance with an example embodiment of the disclosed principles.

Turning to FIG. 8, a more detailed view of an example contact system 207, 209 for connecting the devices 200, 201, 600 is shown. In particular, the figure shows a cross-sectional view of two contacts 801 and two mating contact pucks 803, with additional detail regarding mounting as well.

The back surface 309 of the first device 200 includes a contact assembly having an electrically insulating retainer block 805, which may comprise plastic, resin, ceramic or other suitable material. The retainer block 805 retains the contacts 801 in a sliding relationship thereto, such that the contacts 801 are free to slide between stops in a direction perpendicular to the back surface 309. A contact spring 807 biases each contact 801 outward of the back surface 309. The contact springs 807 are connected to circuitry on the first device printed circuit board (PCB) 809.

Similarly, the back surface 403 of the second device 201 includes an insulating contact puck retainer 811, which may be overmolded of plastic, which surrounds each contact puck 803 and insulates it from the device backing 403, which may be metal. The contact pucks 803 receive the corresponding contacts 801 of the first device 200. Each contact puck 803 is connected to circuitry on the second device PCB 813. In this way, when the first device 200 and the second device 201 are mated, as defined by the alignment pins and corresponding magnetic retention features as shown in FIG. 9, the contacts 801 of the first device 200 are mated with the corresponding contact pucks 803 of the second device 201.

Figure 9:
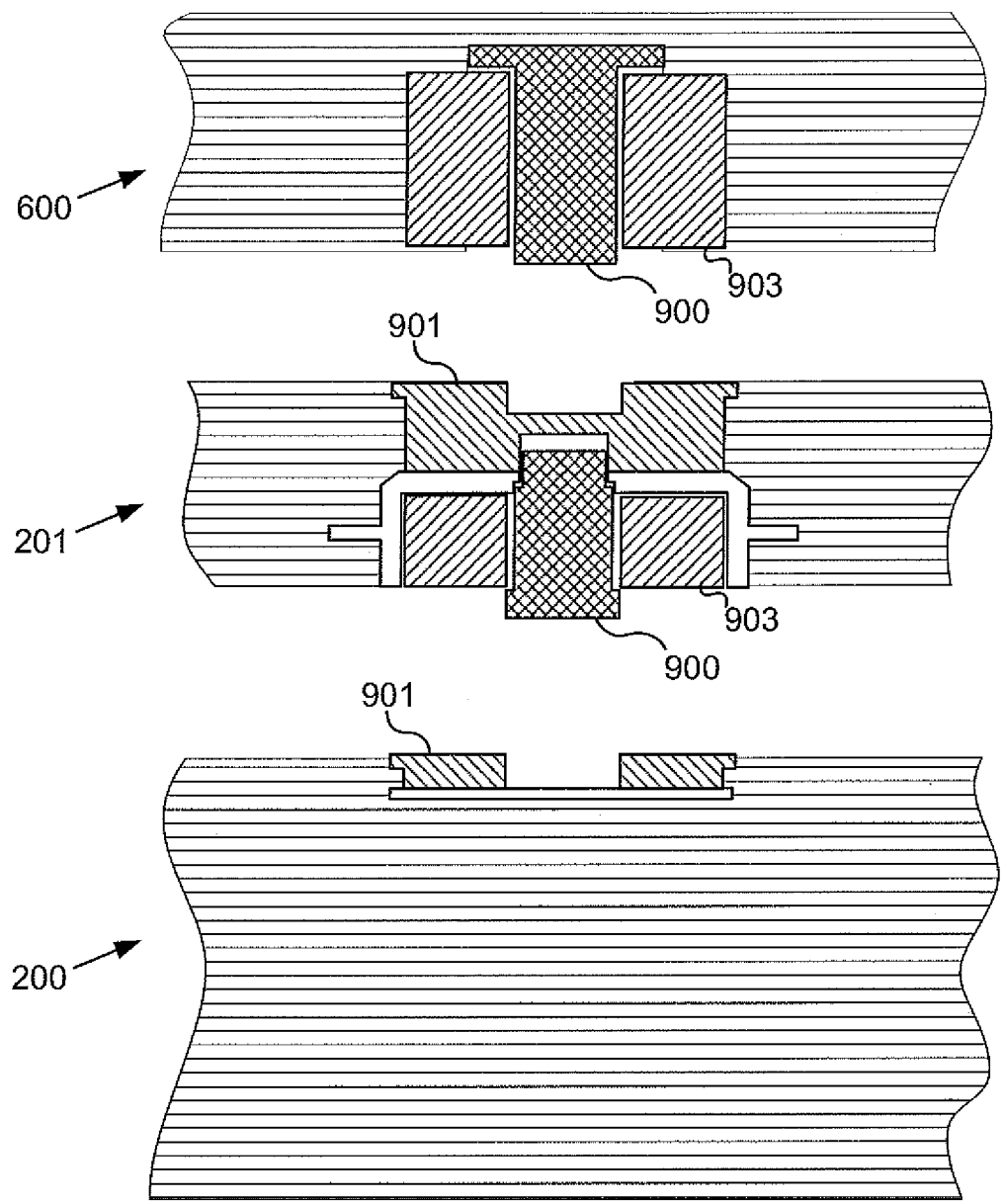
FIG. 9 is a cross-sectional side view showing components of a magnetic retention system in accordance with an example embodiment of the disclosed principles.

Turning to FIG. 9, this figure shows an example of magnetic retention features that hold the devices together and aid in alignment as well, in one embodiment of the disclosed principles. As can be seen, the devices 200, 201, 600 are held together by a magnetic snap system comprising magnetized pins 900 and ferrous plates 901. Annular magnets 603 surround and magnetize the pins 900.

In the illustrated example, the base device 200 includes only a ferrous plate 901 for mating with a magnetized pin 900 of another device. Conversely, the second device 201 and third device 600 both include magnetized pins 900 so both can mate to another device having a ferrous plate 901. Finally, the second device 201 includes not only a magnetized pin 900 but also a ferrous plate 901. In this way, the second device 200 can be retained on the base device 200, while the third device 600 can be mated to the second device 200.

Although only the second device 200 is shown as having both a magnetized pin 900 and a ferrous plate 901, it will be appreciated that all or some other add-on modules may also include both features, allowing a randomized stacking order. Moreover, while only a single magnetic snap location is shown in FIG. 9, each device 200, 201, 600 may include multiple such locations, e.g., one associated with each corner of the device, if such a retention system is used.

It should be noted that although the illustrated examples show the use of multiple stacked add-on modules, it is also contemplated that a given layer may include more than a single module. For example, in an embodiment, two or more modules may be located one over the other or in a side-by-side manner, such that the combination of such modules covers approximately all or less than the mating surface of the base device or prior module layer. This particularly beneficial when it is desired to add a unit of functionality that does not require the same length and width as the base device to implement. Thus, for example, a base device or prior module slice may support a device layer containing within it a video module, an audio module and a communications module.

Figure 10:
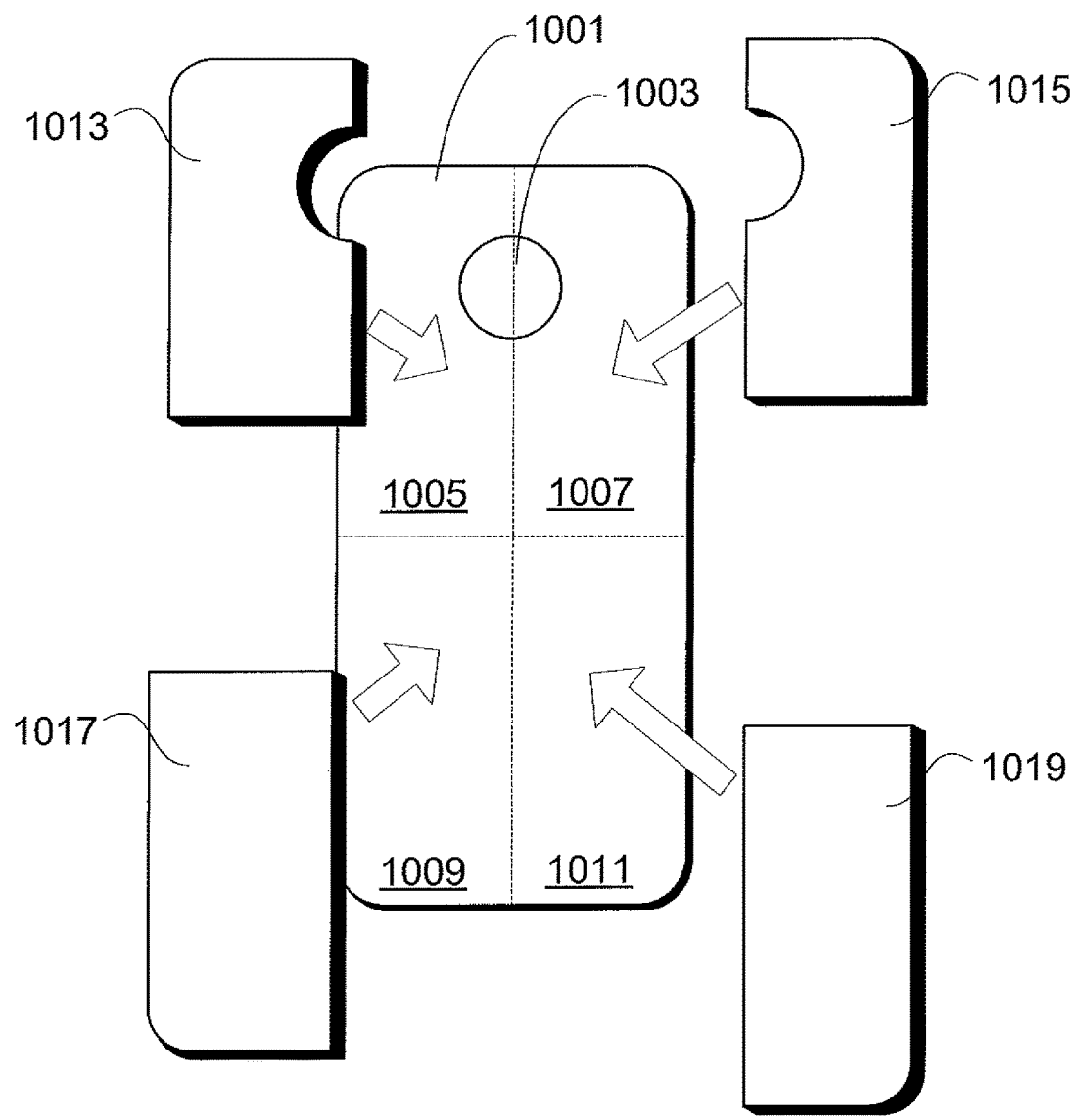
FIG. 10 is a simplified schematic view of a device and additional function modules in accordance with and alternative embodiment of the disclosed principles.

Such a system is shown schematically in FIG. 10. In the illustrated embodiment, the base device 1001 includes a camera protrusion 1003 as well as various electrical connection arrays, retention arrays and alignment arrays (not shown for clarity). These arrays may be similar to those shown previously, however, it will be appreciated that in the illustrated embodiment, such arrays should be present for each sub area 1005, 1007, 1009, 1011.

In operation, one or more of additional functionality modules 1013, 1015, 1017, 1019 are docked in one or more respective ones of sub areas 1005, 1007, 1009, 1011. With respect to additional functionality modules 1013 and 1015, these modules include a cutout area to clear the camera protrusion 1003. However, in alternative forms of this embodiment, not all sub areas are usable, and the various additional functionality modules 1013, 1015, 1017, 1019 need not be of the same size. Moreover, while for additional functionality modules 1013, 1015, 1017, 1019 are shown, it will be appreciated that a greater number of additional functionality modules may be accommodated and that a smaller number of additional functionality modules, e.g., 2 or 3, may be accommodated.

It will be appreciated that a system and method for interconnection in a modular portable device environment have been disclosed herein. However, in view of the many possible embodiments to which the principles of the present disclosure may be applied, it should be recognized that the embodiments described herein with respect to the drawing figures are meant to be illustrative only and should not be taken as limiting the scope of the claims. Therefore, the techniques as described herein contemplate all such embodiments as may come within the scope of the following claims and equivalents thereof.

We claim:

1. A mobile device modular system comprising:
a mobile communications device supporting a plurality of functions and having a first module alignment array, a first module electrical connection array, and a first module retention array; and
a first function module providing an additional function not included in the plurality of functions of the mobile communications device, the first function module having a first side and including on the first side a second module alignment array, a second module electrical connection array, and a second module retention array configured to mate with the first module alignment array, first module electrical connection array, and first module retention array respectively when the first function module is docked to the mobile communications device, the first function module also having a second side opposite the first side, and having on the second side a third module alignment array, third module electrical connection array, and third module retention array configured to mate to a second function module when the second function module is docked to the first function module.

2. The mobile device modular system in accordance with claim 1, wherein one of the first module electrical connection array and the second module electrical connection array includes an array of connection contacts and the other of the first module electrical connection array and the second module electrical connection array includes an array of connection pucks for receiving the connection contacts.

3. The mobile device modular system in accordance with claim 2, wherein one of the second module electrical connection array and the third module electrical connection array includes an array of connection contacts and the other of the second module electrical connection array and the third module electrical connection array includes an array of connection pucks.

4. The mobile device modular system in accordance with claim 1, wherein one of the first module retention array and the second module retention array includes an array of magnetized pins and the other of the first module retention array and the second module retention array includes an array of ferrous elements for receiving the magnetized pins.

5. The mobile device modular system in accordance with claim 4, wherein one of the second module retention array and the third module retention array includes an array of magnetized pins and the other of the second module retention array and the third module retention array includes an array of ferrous elements.

6. The mobile device modular system in accordance with claim 5, wherein one of the first module alignment array and the second module alignment array includes an array of alignment pins and the other of the first module alignment array and the second module alignment array includes an array of alignment sockets for receiving the alignment pins.

7. The mobile device modular system in accordance with claim 6, wherein one of the second module alignment array and the third module alignment array includes an array of alignment pins and the other of the second module alignment array and the third module alignment array includes an array of alignment sockets.

8. The mobile device modular system in accordance with claim 7, wherein the alignment pins and the other of the first module alignment array and the second module alignment array includes an array of alignment sockets for receiving the alignment pins.

9. The mobile device modular system in accordance with claim 8, wherein the magnetized pins comprise the alignment pins, and the ferrous elements comprise the alignment sockets.

10. The mobile device modular system in accordance with claim 1, wherein at least one of the first function module and the second function module has a length or width that is substantially less than a length and width of the mobile communications device.

11. The mobile device modular system in accordance with claim 1, wherein the mobile communications device includes a camera within a camera protrusion and wherein each of the first function module and the second function module includes an opening to accommodate the camera protrusion and to provide a line of sight for the camera.

12. An electronic function module for extending functionality of a base mobile communication device comprising:
- a processor configured to provide extended functionality to the base mobile communication device;
- a first external surface having thereon a first module alignment array, a first module electrical connection array, and a first module retention array configured to mate with respective like arrays on a surface of the base mobile communication device; and
- a second external surface having thereon a second module alignment array, a second module electrical connection array, and a second module retention array configured to mate with respective like arrays on a surface of an additional electronic function module.

13. The electronic function module in accordance with claim 12, wherein one of the first module electrical connection array and the second module electrical connection array includes an array of connection contacts and the other of the first module electrical connection array and the second module electrical connection array includes an array of connection pucks.

14. The electronic function module in accordance with claim 12, wherein one of the first module retention array and the second module retention array includes an array of magnetized pins and the other of the first module retention array and the second module retention array includes an array of ferrous elements.

15. The electronic function module in accordance with claim 14, wherein one of the first module alignment array and the second module alignment array includes an array of alignment pins and the other of the first module alignment array and the second module alignment array includes an array of alignment sockets.

16. The electronic function module in accordance with claim 15, wherein the magnetized pins comprise the alignment pins, and the ferrous elements comprise the alignment sockets.

17. The electronic function module in accordance with claim 12, wherein a length and width of the electronic function module are substantially less than a respective length and width of the base mobile communication device.

18. The electronic function module in accordance with claim 12, further including an opening for a camera protrusion of the base mobile communication device.

* * * * *